March 4, 1947. E. PELL 2,417,012
POLYPHASE INDUCTION MOTOR BRAKING SYSTEM
Filed May 27, 1944 2 Sheets-Sheet 1

Inventor
Eric Pell
By
Attorney

March 4, 1947. E. PELL 2,417,012
POLYPHASE INDUCTION MOTOR BRAKING SYSTEM
Filed May 27, 1944 2 Sheets-Sheet 2

Inventor
Eric Pell
By
Attorney

Patented Mar. 4, 1947

2,417,012

UNITED STATES PATENT OFFICE 2,417,012

POLYPHASE INDUCTION MOTOR BRAKING SYSTEM

Eric Pell, Shorewood, Wis., assignor to Cutler-Hammer, Inc., Milwaukee, Wis., a corporation of Delaware Application May 27, 1944, Serial No. 537,596

10 Claims. (Cl. 172—152)

This invention relates to alternating current dynamo electric machine control and relays therefor.

Where alternating current hoist motors are subjected to unbalancing of their primary voltages for braking it is often desirable to provide for maintaining the unbalanced voltages until the motor is brought substantially to rest even though the master switch be moved to off position prematurely, and it is an object of the present invention to provide a relay particularly useful in accomplishing such maintenance of unbalanced voltages and ultimate interruption of the motor connections.

Another object is to provide a relay for the aforementioned and other uses which is designed for control by electrical conditions prevailing in the circuit of the primary of the controlled dynamo electric machine.

Another object is to provide for control of the relay through variations in the difference between certain currents whereby the controlling variations are a function of the motor speed and are amplified.

Other objects and advantages of the invention will hereinafter appear.

Certain embodiments of the invention are diagrammatically illustrated in the accompanying drawings which will now be described, it being understood that the embodiments illustrated are susceptible of modification without departing from the scope of the appended claims.

Figure 1:
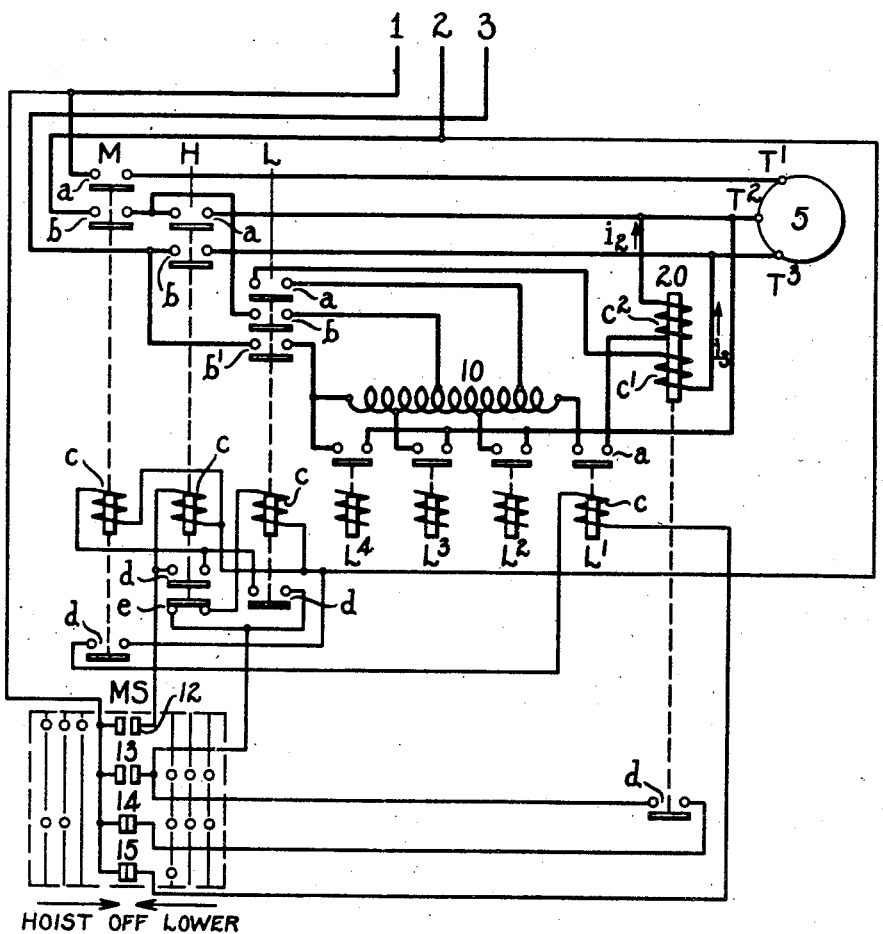
Figure 1 shows the primary connections for a hoist motor, which except for an included relay are now well known.

Referring to Fig. 1, the same shows a hoist motor 5 with primary terminals $T^1$, $T^2$ and $T^3$ which for hoisting operation are to be connected to an alternating current supply comprising lines 1, 2 and 3, through the medium of electromagnetic switches H and M. Both switches are of the double pole type, each comprising contacts $a$ and $b$. The switch H is the direction switch for hoisting and its contacts $b$ afford a direct connection from motor terminal $T^3$ to line 3, while it contacts $a$ complete a connection from motor terminal $T^2$ to line 2 through the contacts $b$ of switch M which is the main switch. The contacts $a$ of switch M establish a direct connection from motor terminal $T^1$ to line 1. Each of the switches M and H is provided with an operating winding $c$ and the switch M has normally disengaged auxiliary contacts $d$, while switch H has normally disengaged auxiliary contacts $d$ and normally engaged auxiliary contacts $e$. The hoisting connections shown are well known, as are also the control connections for the switches M and H, energization of the main switch being dependent upon prior energization of the direction switch H.

For lowering operation of the motor and braking thereof there is provided an electromagnetic switch L which functions in conjunction with the main switch M to establish certain reverse motor connections including an auto transformer 10. The switch L is of the triple pole type, having normally disengaged contacts $a$, $b$ and $b^1$ and has an operating coil $c$. When the switch L responds its contacts $b^1$ connect the left hand terminal of the auto-transformer to line 3 while its contacts $b$ connect the autotransformer winding at an intermediate point to line 2 through the contacts $b$ of the main switch M. The contacts $a$ of the switch L connect the motor terminal $T^3$ to a tap of the autotransformer. An electroresponsive switch $L^1$ having contacts $a$, connects the motor terminal $T^2$ to the right hand terminal of the auto-transformer winding and functions in conjunction with the switch L and main switch M to complete now well known lowering connections providing for unbalanced voltages of the motor for braking action of the motor. This form of lowering control constitutes the subject matter of the application of Ralph P. Anderson, Serial No. 482,273, filed April 8, 1943, the disclosure of such application including all of the disclosure of Fig. 1 herein except for the relay hereinafter discussed.

The controller of Fig. 1 also includes electromagnetic switches $L^2$, $L^3$ and $L^4$ to be operated sequentially in the order named to shift the connection of motor terminal $T^2$ along the autotransformer winding and ultimately to connect said motor terminal direct to line 3 through contacts $b^1$ of switch L. The control circuits for these switches $L^2$, $L^3$ and $L^4$ are not shown herein as they are not essential to an understanding of the control herein claimed. As will be understood, the windings of these switches $L^2$, $L^3$ and $L^4$ would ordinarily be under the control of the master switch provided for the other aforementioned electromagnetic switches.

Such a master switch MS is shown in part in Fig. 1. The partial showing of the master switch comprises sets of contacts 12 and 13 disengaged in the off position of the master switch and sets of contacts 14 and 15 engaged in the off position of the master switch. The circles in line with the sets of contacts indicate different positions of the master switch in which the respective contacts are engaged. Thus the contacts 12 are engaged only when the master switch is moved in hoisting direction while the contacts 13 are engaged only when the master switch is moved in lowering direction. The contacts 14 stay engaged when the master switch is moved in lowering direction through a number of positions and then are disengaged, whereas contacts 15 disengage in all positions of the drum except in off position as shown, and in the first lowering position. Briefly describing the control circuits, contacts 12 of the MS switch when engaged complete circuit from line 1 to the upper terminal of winding c of switch H, the other terminal of said winding having a direct connection to line 2, and the latter connection being common to the winding c of switch M which has its upper terminal connected to line 1 by the contacts d of switch H upon response of the latter. Contacts 13 of the MS switch when engaged complete circuit from line 1 to and through down contacts e of switch H to the upper terminal of winding c of switch L, said winding having its lower terminal connected to line 2, and switch L upon responding engaging its contacts d to energize switch M through connections paralleling those established by contacts d of switch H. Contacts 15 when engaged complete circuit from line 1 to and through the winding c of switch $L^1$ to and through the contacts d of switch M when the latter is energized, and thence to line 2. Contacts 14 of the MS switch control jointly with the relay hereinafter described a circuit paralleling the contacts 13 of the MS switch to maintain switches L and M energized when contacts 13 disengage.

The aforementioned relay of Fig. 1 is designated 20 and comprises contacts d biased to disengage. The relay also comprises bucking windings $c^1$ and $c^2$, the former being connected in circuit between motor terminal $T^3$ and the autotransformer 10 by the contacts a of switch L when said switch is energized, and the winding $c^2$ being connected in circuit between motor terminal $T^2$ and the right hand end terminal of autotransformer by the contacts a of switch $L^1$ when the latter is energized. The purpose of this relay as aforeindicated is to coact with the contacts 14 of the MS switch to maintain switches L and M closed when the MS switch is thrown from a lowering position to off position while the motor is operating at an appreciable speed and then to deenergize said switches as the motor is brought to rest. Also the relay in so functioning indirectly coacts with contacts 15 of the MS switch to maintain switch $L^1$ energized pending deenergization of switch M with consequent disengagement of contacts d.

Figure 5:
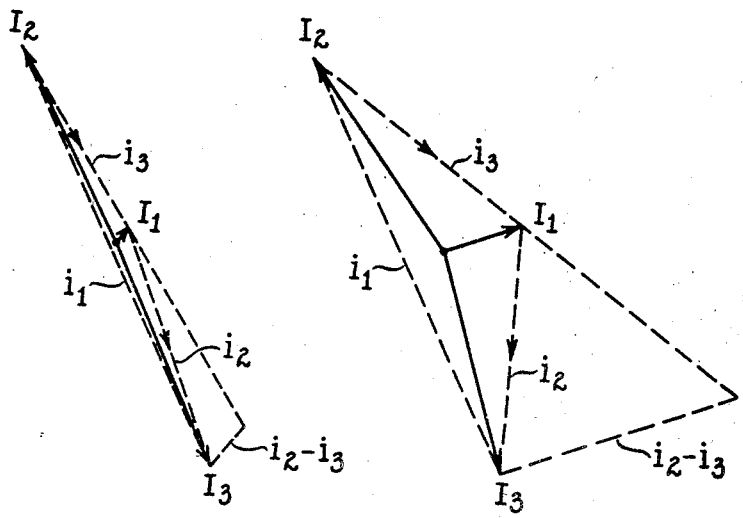
Fig. 5 is a vector showing to facilitate understanding of the control of the relay.

The bucking windings of the relay are subjected by the connections described to currents the difference between which represents a current value variable with the motor speed, the variations in such current value being three times as great as the variations in speed. As shown in the vector diagrams of Fig. 5 wherein $I_1$—$I_2$—$I_3$ represent the phase currents of a delta connected motor and $i_1$—$i_2$—$i_3$ the line currents, the value $i_2$—$i_3$ varies widely between 100% slip and 70% slip of the motor and is of three times the magnitude of $I_1$. Thus it is a simple matter to design relay 20 for release at an intermediate $i_2$—$i_3$ value such as to necessitate bringing the motor substantially to rest as a prerequisite to release of said relay and consequent interruption of lowering connections. On the other hand, the circuit control is such that the relay is operable by one winding unopposed in all lowering positions except the first, for engagement of the relay contacts, thus avoiding complications in effecting closing and opening of the relay under the desired conditions.

Considering more specifically the circuit control of the windings of the relay 20, it will be noted that the winding $c^1$ of said relay is included in circuit by the contacts a of switch L whenever said switch responds to establish lowering connections. On the other hand, the winding $c^2$ of the relay is normally disconnected by switch $L^1$ and response of said switch is dependent upon prior closing of the main switch M and continued engagement of contacts 15 of the MS switch since the contacts d of switch M and said contacts 15 are in series in the energizing circuit of switch $L^1$. Thus winding $c^1$ may be used to close relay 20 without opposition by winding $c^2$ in all lowering positions except the first. When main switch M has responded switch $L^1$ will respond, assuming the contacts 15 to be still in engagement, and switch $L^1$ will connect the relay winding $c^2$ in circuit to buck the winding $c^1$ for release of the relay when the motor approaches zero speed. Here it is to be noted that when the contacts 15 are disengaged to deenergize switch $L^1$ as the result of operation of the MS switch to increase the lowering speed, the relay winding $c^2$ will be disconnected but will be again connected in returning the MS switch to off position. Also it is to be noted that as relay 20 is closed at the time the MS switch is returned from a lowering position to off position it will parallel the MS contacts 13 to maintain energized the switch L and in turn the switch M until such time as the bucking windings release said relay as the result of slowdown of the motor to approximately zero speed, whereupon relay 20 will release to deenergize switch L, this effecting release of switch M and in turn release of switch $L^1$.

Figure 2:
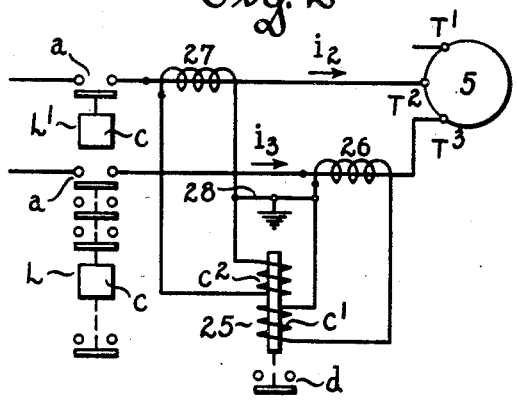
Figs. 2, 3 and 4 show alternative forms of relays which may be substituted for a relay of Fig. 1.

Referring to Fig. 2, the same shows a relay 25 similar to relay 20 of Fig. 1, but having its bucking windings $c^1$ and $c^2$ supplied with current from current transformers 26 and 27 respectively. The primary windings of the transformers 26 and 27 are shown as being introduced into the motor connections correspondingly to the relay windings $C^1$ and $C^2$ of Fig. 1. The transformers have an interconnection 28 which is grounded. This relay will function similarly to the aforedescribed relay of Fig. 1.

Figure 3:
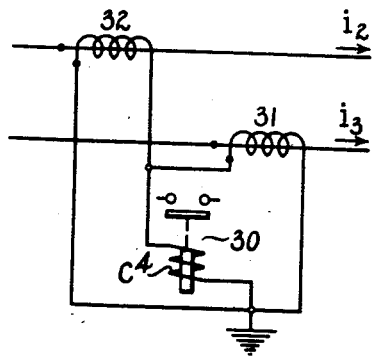

Referring to Fig. 3, the same shows a relay 30 having a single winding $C^4$ supplied by differentially connected current transformers 31 and 32, respectively subjected to the same primary currents as the transformers 26 and 27 of Fig. 2. These transformers 31 and 32 have their secondary windings connected in a grounded loop with the winding $C^4$ connected across the loop with one terminal connected between the transformers. In this case the transformers through their differential action afford control of the relay similar to that afforded by the bucking coils of the relays of Figs. 1 and 2.

Figure 4:
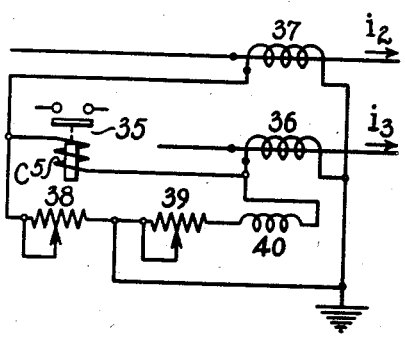

Referring to Fig. 4, the same shows a single coil relay 35 supplied by transformers 36 and 37, the relay coil $C^5$ being connected between the transformers in a grounded loop and said coil being provided with means whereby it may be calibrated for zero current at zero speed of the motor. This calibrating means comprises adjustable resistors 38 and 39 and an inductance 40 connected in series across the coil $C^5$ and having a connection from a point between said resistors to the ground lead of the aforementioned loop.

What I claim as new and desire to secure by Letters Patent is:

1. The combination with an induction motor, of means for braking said motor through the medium of power connections for the primary of said motor, said means comprising an autotransformer through the medium of which the voltages for the motor primary are unbalanced, and said means also comprising, for maintaining said connections subject to interruption thereof when the motor speed is reduced to a given value, electroresponsive means having a plurality of control windings one of which is subjected to the current in certain of said connections and another of which is subjected to the current in other of said connections, said windings jointly providing a controlling influence on said electroresponsive means as a function of change in the difference between the vector values of said currents resulting from change in speed of said motor.

2. The combination with an induction motor, of means to establish power connections for the primary of said motor for braking of said motor, said means including a master switch which in off position tends to interrupt said connections, and electroresponsive means to prevent said master switch from interrupting said connections pending reduction of the motor speed to a given value, said electroresponsive means having control windings in part being sensitive to variations of current in certain of said connections, and in part being sensitive to current variations in other of said connections, to render the aforementioned function of said electroresponsive means controllable by variation in the difference between the vector values of said currents, resulting from variation in the motor speed.

3. The combination with an induction motor, of means to establish power connections for the primary of said motor for braking of said motor, said means including a master switch which in off position tends to interrupt said connections, and electroresponsive means to prevent said master switch from interrupting said connections pending reduction of the motor speed to a given value, said electroresponsive means having control windings in part being sensitive to variations of current in certain of said connections, and in part being sensitive to current variations in other of said connections, to render the aforementioned function of said electroresponsive means controllable by variation in the difference between the vector values of said currents, resulting from variation in the motor speed, said first mentioned means providing for connection in circuit of certain of said windings selected for setting of said electroresponsive means incidentally to subjecting the latter to the aforementioned controlling influence.

4. The combination with an induction motor, of means to establish power connections for the primary of said motor for braking of said motor, said means including a master switch which in off position tends to interrupt said connections, and electroresponsive means to prevent said master switch from interrupting said connections pending reduction of the motor speed to a given value, said electroresponsive means having control windings in part being sensitive to variations of current in certain of said connections and in part being sensitive to current variations in other of said connections, to render the aforementioned function of said electroresponsive means controllable by variation in the difference between the vector values of said currents, resulting from variation in the motor speed, said first mentioned means providing for connection in circuit of certain of said windings selected for setting of said electroresponsive means incidentally to subjecting the latter to the aforementioned controlling influence, and said first mentioned means providing for complete connection of said windings as an incident to return of said master switch from braking positions to off position.

5. The combination with an induction motor, of slowing down means therefor affording power connections for the motor primary, and a control relay for said means having bucking windings one of which is subjected to the influence of current variations in certain of said connections and another of which is subjected to the influence of current variations in other of said connections, whereby said relay when set in a given position is subject to release when the speed of said motor results in a given difference in the vector values of said currents.

6. The combination with an induction motor, of slowing down means therefor affording power connections for the motor primary, and a control relay for said means having bucking windings one of which is subjected to the influence of current variations in certain of said connections and another of which is subjected to the influence of current variations in other of said connections, whereby said relay when set in a given position is subject to release when the speed of said motor results in a given difference in the vector values of said currents, said means providing for connection in circuit of one of said windings alone thereby to provide for said setting of said relay free from bucking action of the other of said windings.

7. The combination with an induction motor, of slowing down means therefor affording power connections for the motor primary, of a control relay comprising an operating winding and current transformers to supply currents to said winding, one of said transformers being coupled to certain of said connections, and the other of said transformers being coupled to other of said connections, whereby said relay following setting thereof in a given position is subject to release when the speed of said motor results in a given difference between the currents supplied by said transformers.

8. The combination with an induction motor, of slowing down means therefor affording power connections for the motor primary, of a control relay comprising an operating winding and current transformers to supply currents to said winding, one of said transformers being coupled to certain of said connections, and the other of said transformers being coupled to other of said connections, whereby said relay following setting thereof in a given position is subject to release when the speed of said motor results in a given difference between the currents supplied by said transformers, and means for calibrating said winding for zero current at zero speed of said motor.

9. The combination with an induction motor, of a power source, means operable to establish power connections for the primary of said motor for braking of said motor, and electroresponsive means controlling said first mentioned means to maintain said connections pending reduction of the motor speed to a given value and then to interrupt said connections, said electroresponsive means comprising windings subjected to influence of currents in said power connections, which currents vary with the speed of said motor and through influence on said windings influence said electroresponsive means as a function of the difference in vector values of said currents.

10. The combination with an induction motor, of a power source, means operable to establish power connections for the primary of said motor for braking of said motor, said means comprising means providing unbalanced voltages for the motor primary, an electroresponsive means controlling said first mentioned means to maintain said connections pending reduction of the motor speed to a given value and then to interrupt said connections, said electroresponsive means comprising windings subjected to influence of currents in said power connections, which currents vary with the speed of said motor and through influence on said windings influence said electroresponsive means as a function of the difference in vector values of said currents.

ERIC PELL.

REFERENCES CITED

The following references are of record in the file of this patent:

UNITED STATES PATENTS

| Number | Name | Date |
| --- | --- | --- |
| 913,415 | Mershon | Feb. 23, 1909 |